United States Patent
Tregnago et al.

(10) Patent No.: US 8,347,830 B2
(45) Date of Patent: Jan. 8, 2013

(54) SYSTEM FOR CONTROLLING AND CONVEYING AIR FLOWS THROUGH THE ENGINE COMPARTMENT OF A MOTOR VEHICLE

(75) Inventors: Roberto Tregnago, Orbassano (IT); Oreste Bertini, Orbassano (IT); Enrico Ribaldone, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 639 days.

(21) Appl. No.: 12/538,540

(22) Filed: Aug. 10, 2009

(65) Prior Publication Data

US 2010/0083918 A1 Apr. 8, 2010

(30) Foreign Application Priority Data

Oct. 8, 2008 (EP) .................................... 08425651

(51) Int. Cl.
*F01P 7/02* (2006.01)
*B60K 11/06* (2006.01)

(52) U.S. Cl. ............... 123/41.05; 123/41.04; 123/41.58; 123/41.59; 180/68.1

(58) Field of Classification Search ............... 123/41.05, 123/41.04, 41.5, 41.56, 41.58, 41.59; 180/68.1
See application file for complete search history.

(56) References Cited

U.S. PATENT DOCUMENTS

| | | | | |
|---|---|---|---|---|
| 3,205,964 A * | 9/1965 | Henry-Biabaud | ........... | 180/68.1 |
| 4,476,820 A * | 10/1984 | Nixon | ........................ | 123/41.05 |
| 4,604,974 A * | 8/1986 | Watanabe | .................. | 123/41.57 |
| 4,706,615 A * | 11/1987 | Scadding | .................. | 123/41.01 |
| 4,756,279 A * | 7/1988 | Temmesfeld | .............. | 123/41.04 |
| 4,969,421 A * | 11/1990 | Haner et al. | ............... | 123/41.49 |
| 4,995,447 A * | 2/1991 | Weidmann et al. | ............. | 165/44 |
| 5,269,264 A * | 12/1993 | Weinhold | .................... | 123/41.05 |
| 5,526,872 A * | 6/1996 | Gielda et al. | .................... | 165/41 |
| 5,626,185 A * | 5/1997 | Gielda et al. | .................... | 165/41 |
| 5,724,925 A * | 3/1998 | Ito | ............................... | 123/41.49 |
| 6,622,807 B2 * | 9/2003 | Preiss | .......................... | 180/68.1 |
| 7,497,287 B2 * | 3/2009 | Kunikata et al. | ............. | 180/68.1 |
| 2006/0254838 A1* | 11/2006 | Ino et al. | ........................ | 180/68.1 |
| 2007/0119395 A1* | 5/2007 | Nagano et al. | ............. | 123/41.65 |

FOREIGN PATENT DOCUMENTS

| | | |
|---|---|---|
| DE | 10 2004 036 772 B3 | 3/2006 |
| EP | 1 715 157 A1 | 10/2006 |
| FR | 1.150.725 A1 | 1/1958 |

* cited by examiner

*Primary Examiner* — Nathaniel Wiehe
*Assistant Examiner* — Grant Moubry
(74) *Attorney, Agent, or Firm* — Sughrue Mion, PLLC

(57) ABSTRACT

A motor vehicle is provided with a conveyor structure that conveys the entire flow of air that traverses the radiator downwards and then longitudinally underneath the floor panel of the motor vehicle, preventing said flow from traversing the engine compartment and obtaining a consequent reduction in the aerodynamic resistance of the motor vehicle. Associated to the aforesaid conveyor structure are active and passive fins for enabling an adequate cooling of the components of the engine unit or electronic components associated thereto during given operating conditions.

7 Claims, 5 Drawing Sheets

SYSTEM FOR CONTROLLING AND CONVEYING AIR FLOWS THROUGH THE ENGINE COMPARTMENT OF A MOTOR VEHICLE

BACKGROUND OF THE INVENTION

The present invention relates to a system for controlling and conveying air flows through the engine compartment of a motor vehicle, specifically for a motor vehicle of the type referred to in the preamble of the annexed Claim 1.

SUMMARY OF THE INVENTION

The technical problem that the present invention intends to solve is that of managing the flow of air that traverses the engine compartment of a motor vehicle in order to improve the aerodynamic characteristics of the motor vehicle. In traditional automobiles, the air that enters the engine compartment from the front part of the motor vehicle is in no way controlled or guided towards the outlet openings and is hence free to lap the various parts of the engine unit and then come out on the outside. Up to the present day, advanced systems tending to convey or guide towards the outlet the air that enters the engine compartment in an optimal way in order to reduce the aerodynamic resistance of the motor vehicle have not been devised.

The object of the present invention is consequently to propose a system that is able to control and convey the flow of air that traverses the engine compartment of a motor vehicle in order to improve in a non-negligible way the aerodynamic characteristics of the vehicle itself.

Another object of the invention consists in achieving the purposes referred to above through the use of relatively simple and low-cost means.

According to the main characteristic of the invention, which forms the subject of the characterizing part of the annexed Claim 1, a structure is provided for conveying the air that has traversed the radiator and the fan set behind it, in the form of a tubular duct, with a widened cylindrical mouth that surrounds the aforesaid fan completely, behind the radiator and that is prolonged downwards in a horizontally widened and vertically flattened portion in a position corresponding to the bottom area of the fan, up to an outflow mouth set underneath the floor panel, on the outside of the body, in order to reduce the aerodynamic resistance of the motor vehicle preventing the passage of a considerable flow of air longitudinally through the engine compartment and conveying the flow at outlet from the radiator underneath the floor panel of the motor vehicle and longitudinally along it.

Thanks to the aforesaid characteristics, the invention makes it possible to prevent the majority of the flow of air that enters the engine compartment from proceeding through it after traversing the radiator. Instead, the flow at outlet behind the radiator is immediately conveyed downwards and then longitudinally up to the outflow mouth underneath the floor panel so as to have a minimum impact on the aerodynamic resistance of the motor vehicle.

In the preferred embodiment, the aforesaid conveyor has a closed wall substantially facing the fan, behind it, for connection of the mouth of the conveyor to the flattened bottom portion.

In theory, the deviation of the main flow of air underneath the engine compartment could present the drawback of not enabling an adequate cooling of some parts of the engine unit, such as the exhaust duct of the engine, or of some electronic components associated to the engine. In order to prevent said drawback, according to a preferred characteristic of the invention, the aforesaid conveyor is provided, in a position corresponding to the aforesaid front wall, with one or more openings controlled by orientable fins to enable the passage of a reduced and controlled amount of air through the engine compartment. Once again in the case of the preferred embodiment, the aforesaid fins form part of a venetian-blind structure, controlled by actuator means, preferably with electrical actuation and controlled by electronic control means on the basis of the signals issued by sensor means for detecting the speed of the motor vehicle and sensor means for detecting a temperature indicating the operating conditions of the engine, for example the temperature of the engine coolant, according to a programmed logic, in order to enable adequate cooling of the components of the engine unit and of the electronic components associated thereto. There may, for example, be envisaged automatic opening of said fins below a pre-set speed of the motor vehicle and/or above a pre-set value of the aforesaid temperature indicating the operating conditions of the engine.

According to a further preferred characteristic, the system according to the invention also envisages, according to a solution in itself known, one or more openings set on the front part of the motor vehicle, alongside the fan, and controlled by passive fins, i.e., ones designed to open as a result of the relative wind when the motor vehicle is travelling above a predetermined speed in order to enable a flow at input to the engine compartment, in parallel to the flow that traverses the radiator at high speeds of the motor vehicle, for example in order to enable adequate cooling of some specific components of the motor vehicle. Said passive fins are recalled towards the closed condition, for example by their own weight and/or in so far as they are equipped with elastic-return means.

The present invention also enables the advantage of achieving acoustic containment and withholding of the heat generated by the engine unit. Said latter aspect is particularly important for the purposes of shortening the duration of the step of engine warm-up after starting, particularly after a cold starting, with consequent saving in terms of fuel consumption.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF THE INVENTION

Figure 1:
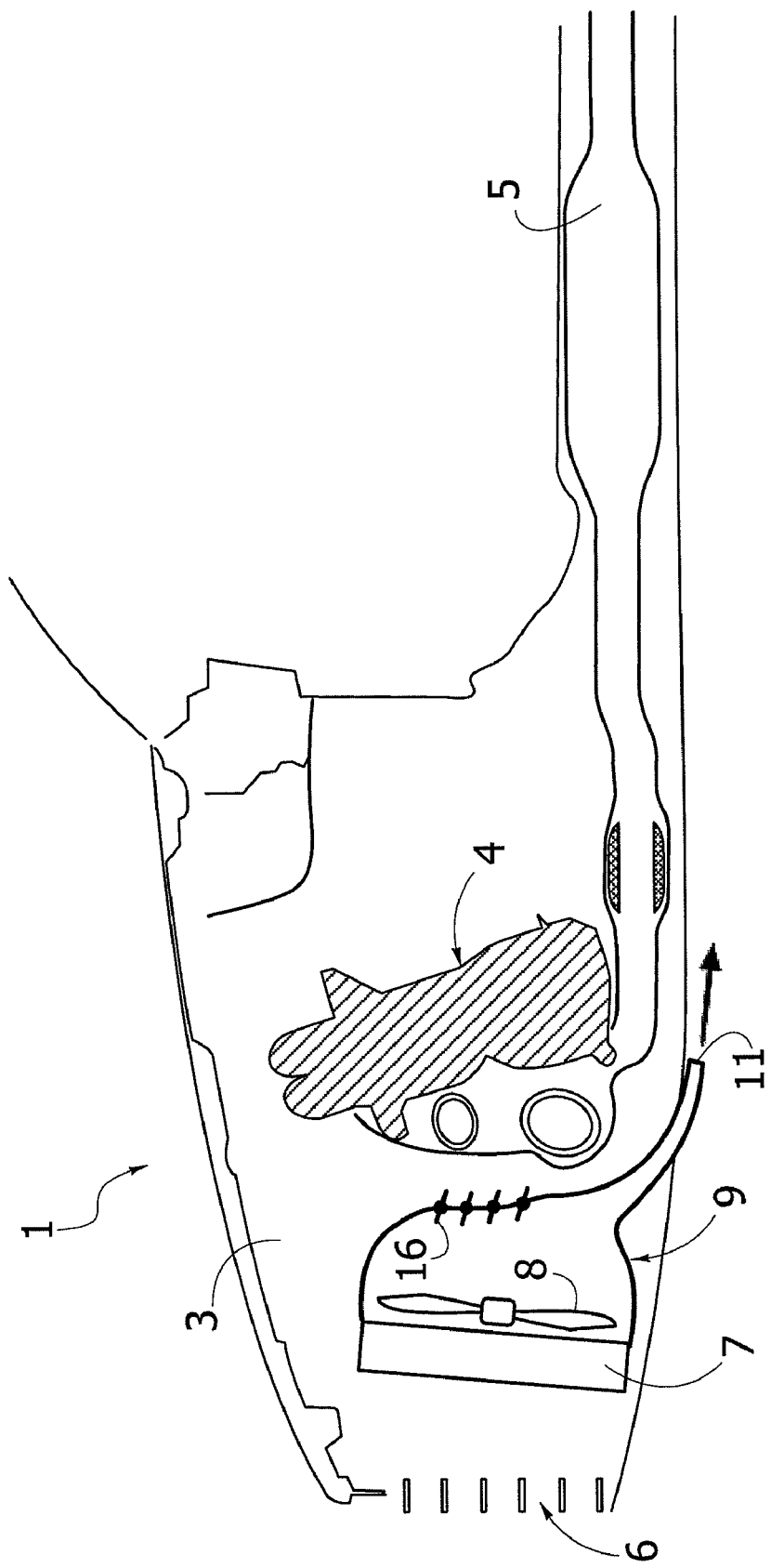
FIG. 1 is a schematic view in longitudinal section of the front part of a motor vehicle equipped with the system according to the invention.
Figure 2:
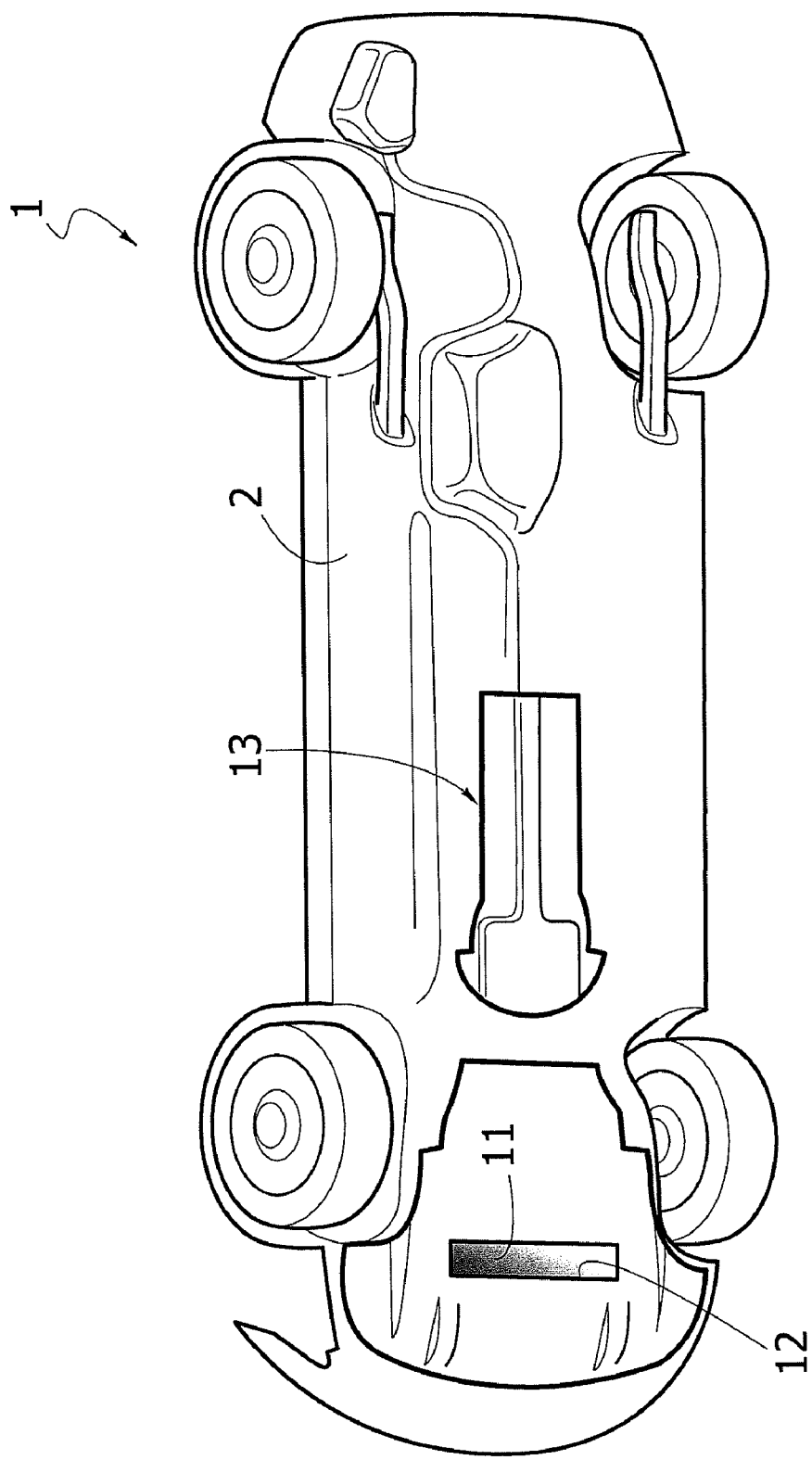
FIG. 2 is a schematic view from beneath of the motor vehicle of FIG. 1.

In the drawings, the reference number 1 designates as a whole an automobile of any known type, comprising a body including a floor panel 2 (see FIG. 2) and defining, in its front part, an engine compartment 3 in which an engine unit 4 is set, from which an exhaust pipe 5 extends, which, in the example illustrated, is set underneath the floor panel in a position corresponding to a tunnel-shaped part thereof. Provided in the front part of the motor vehicle is a grill 6 for access of the air to a radiator 7 inserted in the circuit for the coolant of the engine 4. Provided at the rear of the radiator 7 is a fan 8 controlled in a way in itself known by motor means (not illustrated) that set it in rotation to activate or increase the flow of air through the radiator 7.

In the system according to the invention, the air coming from the front grill 6 that traverses the radiator 7 and the fan 8 does not proceed further through the engine compartment 3 in so far as it is conveyed directly downwards and underneath the floor panel of the motor vehicle by a conveyor structure 9.

Figure 3:
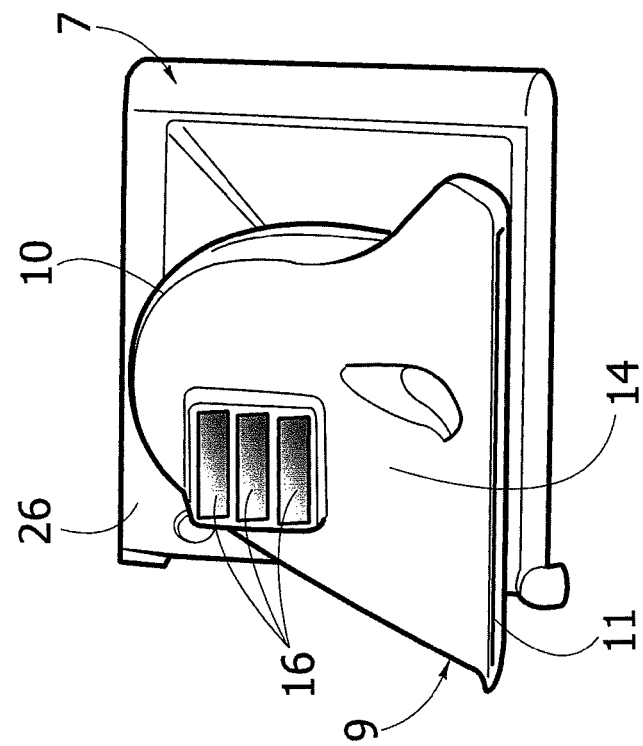
Figure 5:
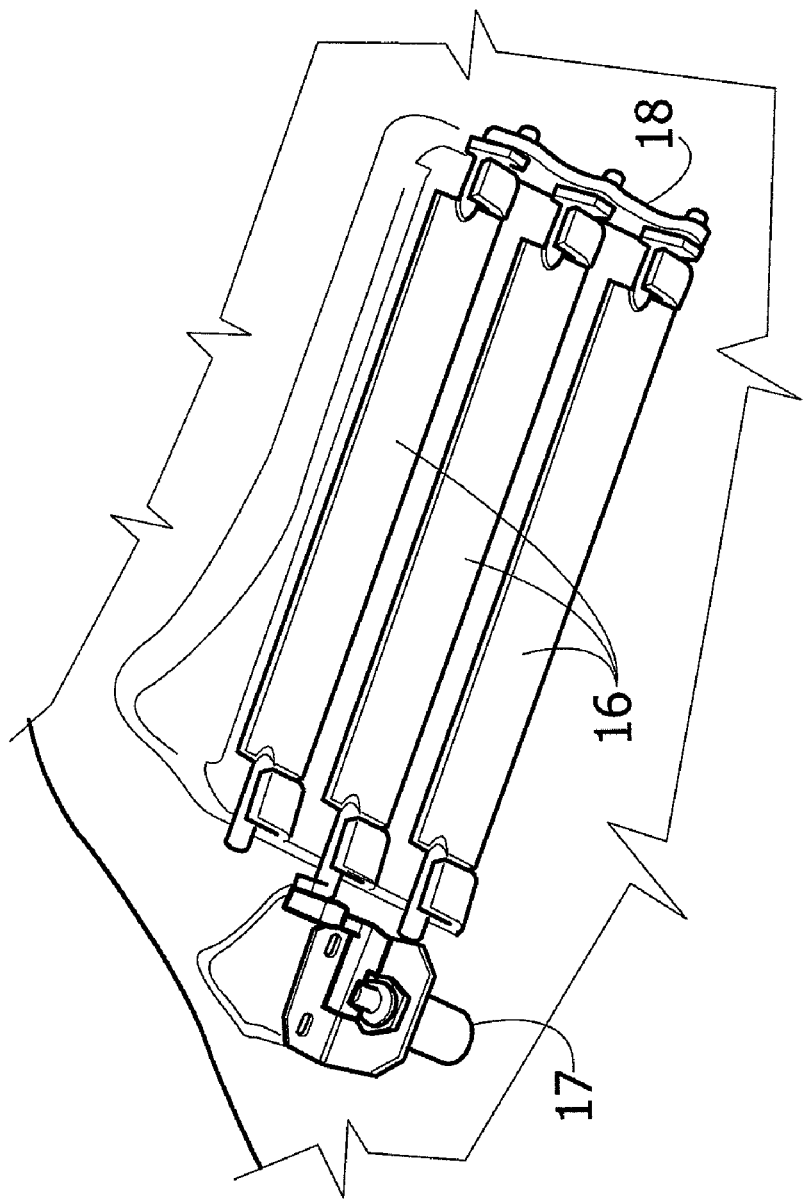
FIGS. 5, 6 and 7 are details at an enlarged scale of the system for controlling the active fins, with which the conveyor forming part of the system according to the invention is provided.
Figure 7:
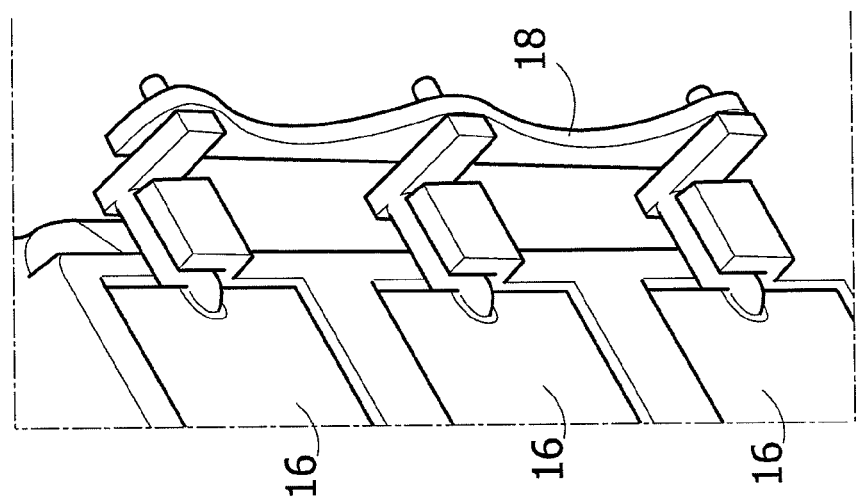
Figure 6:
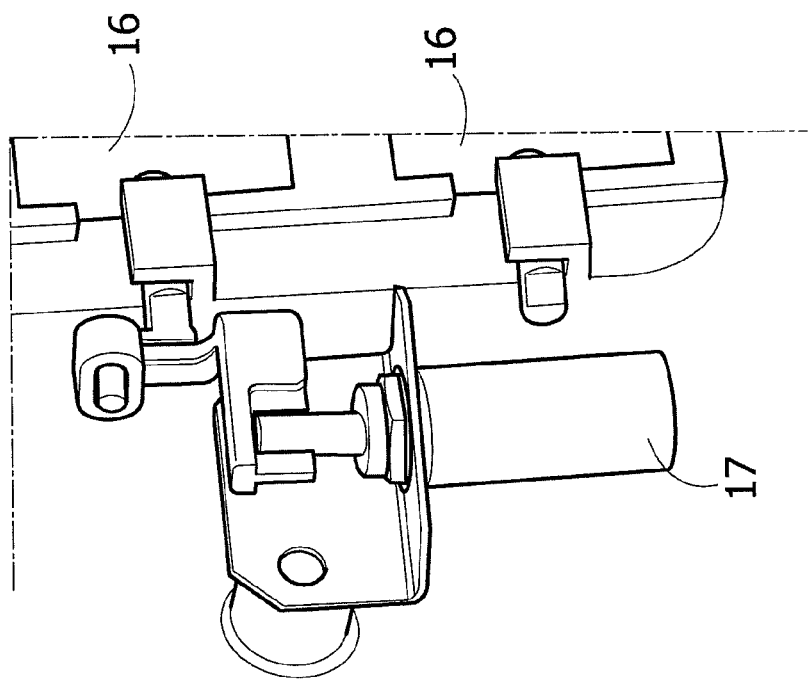

As may be seen in FIG. 3, the conveyor structure 9 is in the form of duct with a widened cylindrical mouth 10 surrounding the fan 8. Starting from said mouth 10, the conveyor 9 is prolonged downwards in a flattened portion 11 that comes out underneath the floor panel 2, through a slot 12 (see FIG. 2) provided in a bottom shield 13 set underneath the floor panel 2 and underneath the engine unit.

As may be seen in FIG. 3, the conveyor 9 has a front wall 14, facing the rear of the fan 8, via which the edge of the cylindrical mouth 10 is radiused with the bottom flattened portion 11 that extends longitudinally backwards starting from the bottom area of the fan.

As illustrated above, as a result of the arrangement of the conveyor 9, the main flow that traverses the radiator 7 and the fan 8 does not proceed further through the engine compartment, but rather is conveyed immediately underneath the floor panel. Studies and tests conducted by the present applicant show that, as a result of said arrangement, the aerodynamic characteristics of the motor vehicle are considerably improved.

At the same time, in order to enable an adequate cooling of the engine unit and of the electronic components associated thereto, particularly at low speeds of the motor vehicle, on the front wall 14 there are provided a number of openings controlled by active fins 16, which form part of a venetian-blind structure (see FIGS. 3 and 5-7) controlled by an electrically actuated actuator 17, for example, an electromagnet or a shape-memory actuator, or else an electric motor or any other type of known device. According to a typical characteristic of the venetian-blind structures, a bar 18 for connection of the fins ensures the synchronized movement of the latter, as illustrated in FIG. 11. Of course, any other arrangement and any other type of control for the active fins 16 may be used.

The actuator 17 is controlled by an electronic control unit (not illustrated), according to a programmed logic, as a function of a signal indicating the speed of the motor vehicle (supplied, for example, by a speed sensor or else generated by the electronic control unit on the basis of data regarding the operating conditions of the engine and of the transmission) and/or as a function of the signal at output from a sensor of a temperature indicating the running conditions of the engine, for example the temperature of the coolant, in order to control opening of the fins below a predetermined speed and/or above a predetermined value of the aforesaid temperature.

Figure 4:
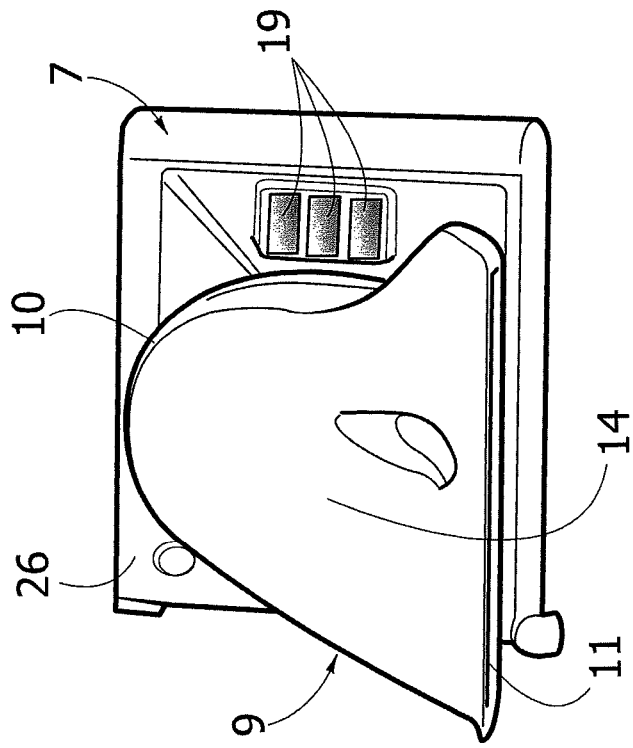
FIGS. 3 and 4 are schematic views, which illustrate the active and passive fins, with which the conveyor forming part of the system according to the invention is provided.

According to a further characteristic (FIG. 4), in accordance with a solution in itself known, provided alongside the conveyor 9 are openings controlled by passive fins 19 that open automatically as a result of the relative wind above a predetermined speed to enable adequate cooling of some components of the engine unit and/or of the motor vehicle (for example the brakes) at high speeds. Said passive fins are recalled towards the closed condition, for example by their own weight and/or in so far as they are equipped with elastic-return means. In the case of the example illustrated, the fins 19 are provided in a closed wall 26 that covers the radiator at the rear on the outside of the conveyor structure 9. They could, however, be provided in any other area of the front wall of the motor vehicle.

Some of the electronic components associated to the engine unit that call for particular attention as regards adequate cooling thereof may obviously be provided within the engine compartment in positions that are suitable for receiving an adequate flow of air following upon opening of the active fins 16 and passive fins 19.

As emerges clearly from the foregoing description, the system according to the invention enables, with relatively simple and low-cost means, considerable advantages both from the standpoint of the reduction of the aerodynamic resistance of the motor vehicle, and hence of the reduction of the fuel consumption, and from the standpoint of the improvement of the acoustic and thermal insulation of the engine compartment, once again with consequent advantages in terms of reduction of consumption, in the engine warm-up stages.

Of course, without prejudice to the principle of the invention, the details of construction and the embodiments may vary widely with respect to what is described and illustrated herein purely by way of example, without thereby departing from the scope of the present invention.

What is claimed is:

1. A motor vehicle comprising a body having a floor panel and an engine compartment defined in the front part of the body, a liquid-cooled engine, supported by the body inside the engine compartment, a radiator forming part of the cooling system of the engine and set in front of the engine compartment, and a fan facing the radiator at the rear, wherein a conveyor structure is provided for the air that has traversed the radiator and the fan, in the form of a monolithic tubular duct, with a widened cylindrical mouth that surrounds the fan completely behind the radiator, said duct extending downwards from said mouth to a vertically flattened portion that starts at the bottom area of the fan and that extends longitudinally towards the rear of the vehicle, so as to end in an outflow mouth set underneath the floor panel, on the outside of the floor panel, in order to reduce the aerodynamic resistance of the motor vehicle, preventing the passage of a considerable flow of air longitudinally through the engine compartment and conveying the flow at outlet from the radiator underneath the floor panel of the motor vehicle and longitudinally along it, said vertically flattened portion of the conveyor structure being horizontally widened towards the rear of the vehicle.

2. The motor vehicle according to claim 1, wherein said conveyor structure has a fan facing wall, which substantially faces the rear of the fan and connects the edge of the aforesaid widened cylindrical mouth with the aforesaid flattened bottom portion.

3. The motor vehicle according to claim 2, wherein provided in a position corresponding to said fan facing wall are one or more openings controlled by orientable fins.

4. The motor vehicle according to claim 3, wherein the aforesaid fins are controlled by actuator means as a function of the speed of the vehicle and/or a temperature indicating the operating conditions of the engine, for example the temperature of the coolant.

5. The motor vehicle according to claim 4, wherein the aforesaid actuator means are electrically actuated and are controlled by electronic means for controlling according to a programmed logic, as a function of signals indicating the speed of the motor vehicle and/or the aforesaid temperature.

6. The motor vehicle according to claim 5, wherein said actuator means are chosen from amongst: electromagnetic actuators, electric motors, and shape-memory actuators.

7. The motor vehicle according to claim 3, wherein in a front part of the motor vehicle, alongside the conveyor structure there are moreover provided auxiliary openings controlled by passive fins, designed to open automatically as a result of the relative wind when the motor vehicle is travelling faster than a predetermined speed.

* * * * *